United States Patent [19]
Obrecht et al.

[11] Patent Number: 5,252,010
[45] Date of Patent: * Oct. 12, 1993

[54] ADJUSTABLE STOP ASSEMBLY FOR A PRESS

[75] Inventors: Robert Obrecht, Bloomfield Hills; Carl Aiken, Southfield, both of Mich.

[73] Assignee: Technical Manufacturing Corporation, Detroit, Mich.

[ * ] Notice: The portion of the term of this patent subsequent to Apr. 21, 2009 has been disclaimed.

[21] Appl. No.: 863,411

[22] Filed: Apr. 3, 1992

Related U.S. Application Data

[63] Continuation of Ser. No. 673,371, Mar. 22, 1991, Pat. No. 5,106,242.

[51] Int. Cl.$^5$ ............................................. B23B 49/00
[52] U.S. Cl. ................................. 408/241 S; 33/642; 409/218
[58] Field of Search ............... 408/14, 241 S; 409/218; 33/201, 628, 630, 638, 642, 710

[56] References Cited

U.S. PATENT DOCUMENTS

| | | |
|---|---|---|
| 2,110,537 | 3/1938 | Tautz . |
| 2,318,691 | 5/1943 | Huthsing . |
| 2,490,307 | 12/1949 | Karr . |
| 2,574,653 | 11/1951 | Miller . |
| 2,664,768 | 1/1954 | Clyne . |
| 2,736,227 | 2/1956 | Stroble ........................ 408/241 S |
| 3,037,404 | 6/1962 | Burg ............................ 408/241 S |
| 3,037,405 | 6/1962 | Steyskal ...................... 408/241 S |
| 3,082,650 | 3/1963 | Young . |
| 3,224,104 | 12/1965 | Platt, II ........................... 33/172 |
| 3,435,730 | 4/1969 | Berberian . |
| 3,689,172 | 9/1972 | Stites ........................... 408/241 S |
| 3,724,963 | 4/1973 | Stadtmiller ...................... 408/14 |
| 4,330,052 | 5/1982 | Schymick ......................... 408/14 |
| 4,436,462 | 3/1984 | Martinez ......................... 409/218 |
| 4,693,656 | 9/1987 | Guthrie ....................... 408/241 S |
| 4,787,794 | 11/1988 | Guthrie ........................... 411/433 |
| 5,106,242 | 4/1992 | Obrecht et al. ............... 408/241 S |
| 5,127,775 | 7/1992 | Broadbent et al. ............ 408/241 S |

Primary Examiner—Daniel W. Howell
Attorney, Agent, or Firm—Krass & Young

[57] ABSTRACT

An adjustable stop assembly for use with a drill press including a ratchet bar adapted to be vertically positioned between spaced ears on the housing of the press and adapted to pass through an annular quill stop carried by the quill of the press so that the quill stop moves up and down the ratchet bar in response to vertical movement of the quill. A slide assembly is positioned on the ratchet bar and includes a slide, a ratchet dog, a stop nut, and a lock nut. The slide includes a lower annular base portion, an upper externally threaded barrel portion, and a central bore slidably passing the ratchet bar. The ratchet dog comprises a spring biased plunger mounted in the slide base portion and having an inner tip for ratcheting engagement with the ratchet bar. The stop nut and the lock nut are threaded onto the externally threaded barrel portion of the slide. To adjust the stop setting of the press, and thereby the extent to which the associated bit or other tool will be moved into the workpiece, the plunger of the ratchet dog is pulled out to release the slide, the slide is moved in a gross manner along the ratchet bar to achieve an approximation of the desired final setting, the stop nut is moved threadably on the threaded barrel portion of the slide to achieve the final precise setting, and the lock nut is rotated to lock the stop nut.

3 Claims, 1 Drawing Sheet

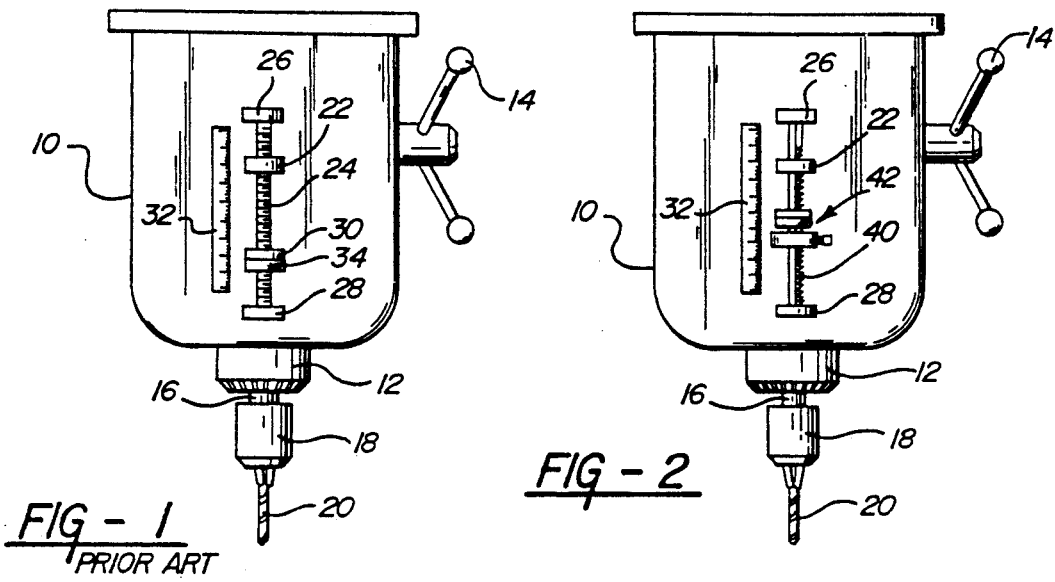
FIG – 1 PRIOR ART
FIG – 2
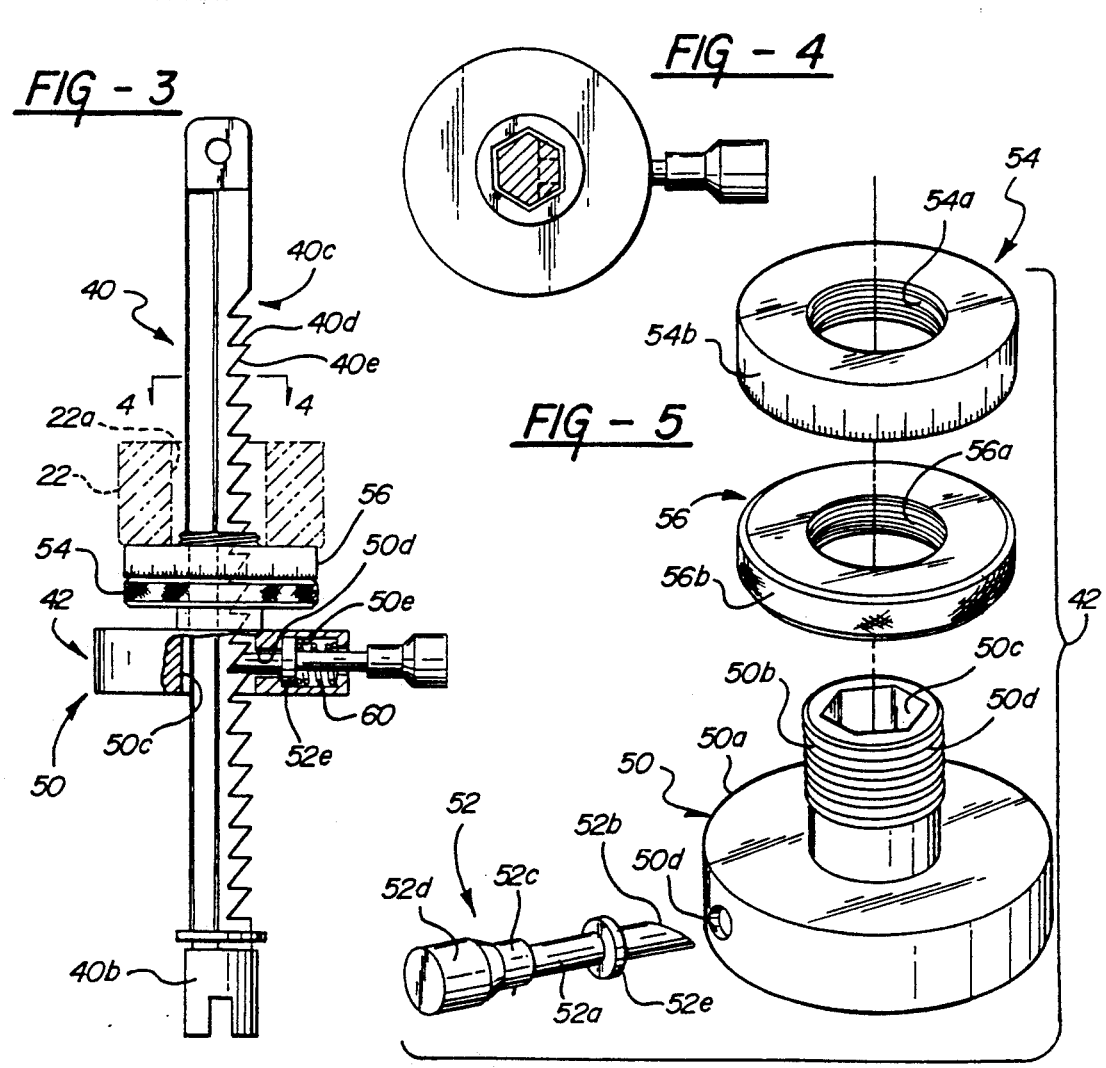
FIG – 3
FIG – 4
FIG – 5

3
5,252,010

1

ADJUSTABLE STOP ASSEMBLY FOR A PRESS

This application is a continuation of application Ser. No. 673,371, filed Mar. 22, 1991, now U.S. Pat. No. 5,106,242.

BACKGROUND OF THE INVENTION

This invention relates to an adjustable stop assembly for a press and more particularly to an adjustable stop assembly for a drill press.

In general, stops and guides for use in drilling, depth milling and other similar machining operations are known. For example, a typical commercially available "Bridgeport" vertical milling machine includes a stop assembly which coacts with a stop carried by the quill of the press to determine the depth of the drilling or milling operation to be achieved. It is important that the adjustable stop assembly allow the depth setting for the press to be quickly and accurately achieved since many such settings may be used in the course of a short period of tool usage. Whereas many such stop assemblies have been proposed and have been utilized, all of the previously provided stop assemblies require an adjustment that is unduly time consuming and/or comprise a mechanism that is unduly complicated and expensive.

SUMMARY OF THE INVENTION

The present invention is directed to the provision of a stop assembly for a press that provides extremely quick and accurate adjustment of the stop assembly setting and that is simple and economical in construction.

According to an important feature of the invention, the adjustable stop assembly includes a bar, defining a plurality of indentations at spaced locations along the bar; a slide mounted for axial sliding movement on the bar and including an externally threaded barrel portion surrounding the bar, a detent mechanism carried by the slide and selectively engageable with the indentations on the bar, and a stop nut threaded on the threaded barrel portion. This arrangement allows extremely quick adjustment of the setting of the stop assembly and, specifically, allows the slide to be adjusted in a gross manner by release of the detent mechanism and gross movement of the slide along the bar followed by rotation of the stop nut on the threaded barrel portion of the slide to provide the final fine adjustment.

According to a further feature of the invention, the assembly further includes a lock nut threaded on the barrel portion of the slide. This arrangement allows the stop nut to be firmly locked in any position of fine adjustment.

According to a further feature of the invention, the slide includes an annular base portion surrounding the bar and positioned beneath the barrel portion and the detent mechanism is mounted on the base portion. This arrangement provides a convenient and readily manufacturable slide package so as to minimize the cost of the stop assembly.

According to a further feature of the invention, the detent mechanism comprises a spring biased plunger mounted for sliding generally radial movement in the base portion of the slide and including a radially inner tip for engagement with the bar. This simple plunger arrangement further simplifies the overall construction of the stop assembly.

BRIEF DESCRIPTION OF THE DRAWINGS

FIG. 1 is a somewhat schematic view of a drill press of the Bridgeport type equipped with a prior art adjustable stop assembly;

FIG. 2 is a similar view of a Bridgeport type drill press equipped with an adjustable stop assembly according to the invention;

FIG. 3 is an assembled view of the invention adjustable stop assembly;

FIG. 4 is a view taken on line 4—4 of FIG. 3; and

FIG. 5 is an exploded view of a slide assembly utilized in the invention adjustable stop assembly.

DETAILED DESCRIPTION OF THE PREFERRED EMBODIMENT

The Bridgeport type press seen in FIG. 1 includes a housing 10, a quill 12 mounted for vertical movement within the housing 10 in known manner in response to actuation of a handle 14, a spindle 16 journalled in the quill, a chuck 18 carried by the lower end of the spindle, a tool such as a drill bit 20 carried by the chuck, and an annular quill stop 22 carried by and movable vertically with the quill 12. The press of FIG. 1 further, in known manner, includes an adjustable stop assembly including a screw 24 extending between housing ears 26 and 28 and passing through the bore 22a of annular quill stop 22 and a stop nut 30 threaded on screw 24. It will be seen that as the quill 12 is moved vertically in the housing in response to movement of the handle 14, the quill stop 22 moves vertically up and down along screw 24 with the extent of downward movement being determined by coaction of stop 22 with stop nut 30 so that the depth of the drilling or other operation is adjusted by threaded movement of nut 30 along screw 24 with the precise extent of the depth measured and determined by a graduated scale 32 secured to the front face of the housing of the press in parallel side-by-side relation to screw 24 so that the position of the stop nut 30, and thereby the depth for which the press is set, can be readily ascertained by cross reference to the markings on the scale 32. Stop nut 30 also typically includes an engraved micrometer scale therearound with equally spaced division so as to provide a micrometer arrangement, and a lock nut 34 is also typically provided on screw 24 beneath stop nut 30 to lock the stop nut 30 in any adjusted position along the screw.

The invention adjustable stop assembly includes a ratchet bar 40 and a slide assembly 42.

Ratchet bar 40 is formed of a hardened steel and has a hexagonal cross-sectional configuration throughout the majority of its length but with cylindrical cross-sectional configurations at its upper end 40a and at its lower end 40b to facilitate mounting of the upper and lower ends of the ratchet bar in the ears 26 and 28 of the press housing 10. A series of indentations in the form of ratchet teeth or detents 40c are provided in serial fashion along the majority of the length of the bar with each tooth including a generally radially extending portion 40d and an oblique portion 40e.

Slide assembly 42 includes a slide 50, a detent mechanism 52, a stop nut 54, and lock nut 56.

Slide 50 is formed of a suitable hardened steel and includes an annular base portion 50a and an externally threaded barrel portion 50b centrally upstanding from base portion 50a.

Base portion 50a includes a central hexagonal bore 50c which also extends upwardly through the threaded barrel portion 50b. Bore 50c has a cross-sectional configuration matching the cross-sectional configuration of ratchet bar 40 but is slightly larger than ratchet bar 40 so as to allow the slide to move freely up and down on the ratchet bar.

Barrel portion 50b is externally threaded at 50d and has an outside diameter slightly less than the diameter of bore 22a of quill stop 22.

Detent mechanism 52 comprises a ratchet dog 52 in the form of a plunger slidably received in a radial bore 50d in slide base portion 50a. Plunger 52 includes a shaft portion 52a slidably received in bore 50d and terminating at its radial inner end in a ratchet tip 52b having a configuration generally conforming to the configuration of ratchet teeth 40c, an intermediate portion 52c, and a knob or handle portion 52d. *A coil spring 60 positioned within an enlarged portion 50e of bore 50d* coacts with a collar 52e on the shaft portion of plunger 52 to bias the plunger radially inwardly into locking, ratcheting engagement with the ratchet bar while allowing the plunger to be pulled radially outwardly against the resistance of the spring to release the ratchet tip 52b from engagement with the ratchet bar and allow the slide to be moved axially along the ratchet bar.

Stop nut 54 is formed of a hardened steel, includes a central threaded bore 54a sized and configured for threaded engagement with the external threads of slide barrel portion 50b, and includes micrometer scale indicia 54b on the outer circumference of the nut.

Lock nut 56 is formed of a hardened steel and includes a central threaded aperture 56a for threaded coaction with the external threads of slide barrel portion 50b and a knurled external circumference 56d to facilitate grasping of the nut. The outer diameter of nut 56 approximates the outer diameter of nut 54.

In the assembled position of the invention adjustable stop assembly on the drill press, as seen in FIG. 2, ratchet bar 40 extends between ears 26 and 28 and passes through annular quill stop 22, and slide assembly 42 is positioned on ratchet bar 40 for coaction with the quill stop 22 to determine the depth or extent of downward movement of the tool 20 with annular stop 22 assuming a surrounding disposition with respect to the upper end of slide barrel portion 50b with the lower face of annular stop 22 in stopping engagement with the upper face of stop nut 54. The invention adjustable stop assembly provides an extremely simple construction and yet a construction which allows the depth setting of the press to be quickly and accurately changed.

Specifically, when it is desired to change the depth setting of the press, the plunger 52 is released to release the engagement of ratchet tip 52b with the ratchet tooth, the slide assembly is moved along the ratchet bar 40 in a gross manner to approximate the desired new depth setting, the micrometer stop nut 54 is finely adjusted by threaded rotation on the threaded barrel 50b, and the precise final position of the stop nut is locked in place by threaded rotation of lock nut 56. The precise position of adjustment of the stop nut 54, and thereby the precise depth setting of the machine, is at all times readily ascertainable by reference to the scale 32 and the micrometer gradations 54b on the external circumference of the stop nut allow precise adjustment of the stop nut to achieve the final desired precise stop setting.

The invention will be seen to provide an adjustable stop assembly for a drill press or the like which is extremely simple in construction and yet which allows the stop setting of the press to be quickly and accurately changed, even by unskilled operators.

Whereas a preferred embodiment of the invention has been illustrated and described in detail, it will be apparent that various changes may be made in the disclosed embodiment without departing from the scope or spirit of the invention.

What is claimed is:

1. An adjustable stop assembly for a press comprising:
   a bar defining a plurality of indentations at spaced locations along the bar;
   a slide mounted for axial sliding movement on said bar in surrounding relation to said bar and including an upper externally threaded barrel portion and a lower base portion;
   a spring biased plunger mounted in said base portion for radial sliding movement and including a radially inner tip portion selectively engageable with said indentations and a radially outer handle portion positioned radially outwardly of said base portion for grasping by the press operator; and
   a stop nut threaded on said threaded barrel portion.

2. A stop assembly according to claim 1 wherein said stop assembly further includes a lock nut threaded on said barrel portion beneath said stop nut.

3. A stop assembly according to claim 1 wherein said lower base portion has an enlarged diameter relative to said upper barrel portion and the spring biasing of the plunger is achieved by a spring positioned in a cavity in said base portion in surrounding relation to said plunger.

* * * * *